United States Patent
Sun et al.

(10) Patent No.: US 6,788,219 B2
(45) Date of Patent: Sep. 7, 2004

(54) STRUCTURE AND METHOD FOR PULSE TELEMETRY

(75) Inventors: Cili Sun, Sugarland, TX (US); Laban M. Marsh, Houston, TX (US); Bipin K. Pillai, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 60 days.

(21) Appl. No.: 10/306,487

(22) Filed: Nov. 27, 2002

(65) Prior Publication Data

US 2004/0100393 A1 May 27, 2004

(51) Int. Cl.$^7$ ............................................. H04L 27/30
(52) U.S. Cl. .................. 340/870.23; 375/239; 329/313; 332/112
(58) Field of Search ............... 340/870.23, 870.24, 340/855.4; 375/237, 238, 239, 240.27, 241; 329/313; 332/112

(56) References Cited

U.S. PATENT DOCUMENTS

| | | | |
|---|---|---|---|
| 4,764,769 A | * 8/1988 | Hayworth et al. | 342/50 |
| 5,113,379 A | 5/1992 | Scherbatskoy | 367/83 |
| 5,150,333 A | 9/1992 | Scherbatskoy | 367/83 |
| 5,331,318 A | 7/1994 | Montgomery | 340/855.4 |
| 5,353,303 A | * 10/1994 | Walthall | 375/145 |
| 5,818,352 A | 10/1998 | McClure | 340/854.6 |
| 5,963,138 A | 10/1999 | Gruenhagen | 340/679 |
| 6,021,095 A | 2/2000 | Tubel et al. | 367/82 |

FOREIGN PATENT DOCUMENTS

| | | |
|---|---|---|
| EP | 0 744 527 B1 | 5/1995 |
| WO | WO 97/14869 | 4/1997 |

OTHER PUBLICATIONS

U.S. patent application Ser. No. 09/783,158; Filed Feb. 14, 2001; titled: Downlink Telemetry System.

* cited by examiner

*Primary Examiner*—Michael Horabik
*Assistant Examiner*—Hung Dang
(74) *Attorney, Agent, or Firm*—Mark E. Scott; Conley Rose, P.C.

(57) ABSTRACT

A mud pulse telemetry technique that uses a number of bits per interval based on parameters of the pulse position modulation system in order to reduce data transfer time in a pulse position modulation system. More particularly, depending on parameters of the pulse position modulation such as the minimum-time and the bit-width, it may be possible to decrease overall transmission time by splitting values having a larger number of bits into multiple transmissions with each transmission having a smaller number of bits.

42 Claims, 2 Drawing Sheets

STRUCTURE AND METHOD FOR PULSE TELEMETRY

CROSS-REFERENCE TO RELATED APPLICATIONS

This application is related to application Ser. No. 10/305,529, titled "Data Recovery for Pulse Telemetry Using Pulse Position Modulation," filed concurrently herewith, assigned to the same assignee, and incorporated by reference herein as if reproduced in full below.

STATEMENT REGARDING FEDERALLY SPONSORED RESEARCH OR DEVELOPMENT

Not applicable.

BACKGROUND OF THE INVENTION

1. Field of the Invention

The embodiments disclosed in the specification are directed to increasing the efficiency of data transfer in pulse telemetry systems. More particularly, the embodiments disclosed are directed to an encoding system that increases the bit transfer rate in mud pulse telemetry systems.

2. Background of the Invention

Mud pulse telemetry is used to communicate information from downhole devices to the surface during drilling. This information may include measuring-while-drilling (MWD) information (direction and orientation of the bottomhole assembly, downhole pressure, borehole characteristics, and the like), as well as logging-while-drilling (LWD) information regarding the surrounding formation (electromagnetic wave resistivity, gamma ray, density, and the like).

The communication medium for mud pulse telemetry is the column of drilling fluid within the drill string. The primary purpose of the drilling fluid, however, is not to facilitate data communications, but is to provide adequate downhole pressure to prevent blow-outs, to cool and lubricate the drill bit, and to carry cuttings to the surface. To facilitate the primary purposes, the drilling fluid is pumped into the drill string at high pressure, which causes pressure fluctuations—noise. Further, the downhole environment generates significant noise in the column of drilling fluid. These factors make data communications using pressure pulses imparted to the drilling fluid difficult.

The oil field services industry is always looking for ways to increase the data transmission rate of information from downhole to the surface.

BRIEF SUMMARY OF SOME OF THE PREFERRED EMBODIMENTS

The problems noted above are solved in large part by a method and related system that increases data transfer efficiency. More particularly, the specification discloses transfer of data by selectively splitting the data into a particular number of bits (for example an eight bit number may be split into two four bit numbers) and sending the data to the surface into smaller groupings, creating shorter transfer times. Further, the specification discloses an increased number of parity values, which may be used to detect and correct errors.

The disclosed devices and methods comprise a combination of features and advantages which enable it to overcome the deficiencies of the prior art devices. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components or steps. This document does not intend to distinguish between components or steps that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

DETAILED DESCRIPTION OF THE PREFERRED EMBODIMENTS

Figure 1:
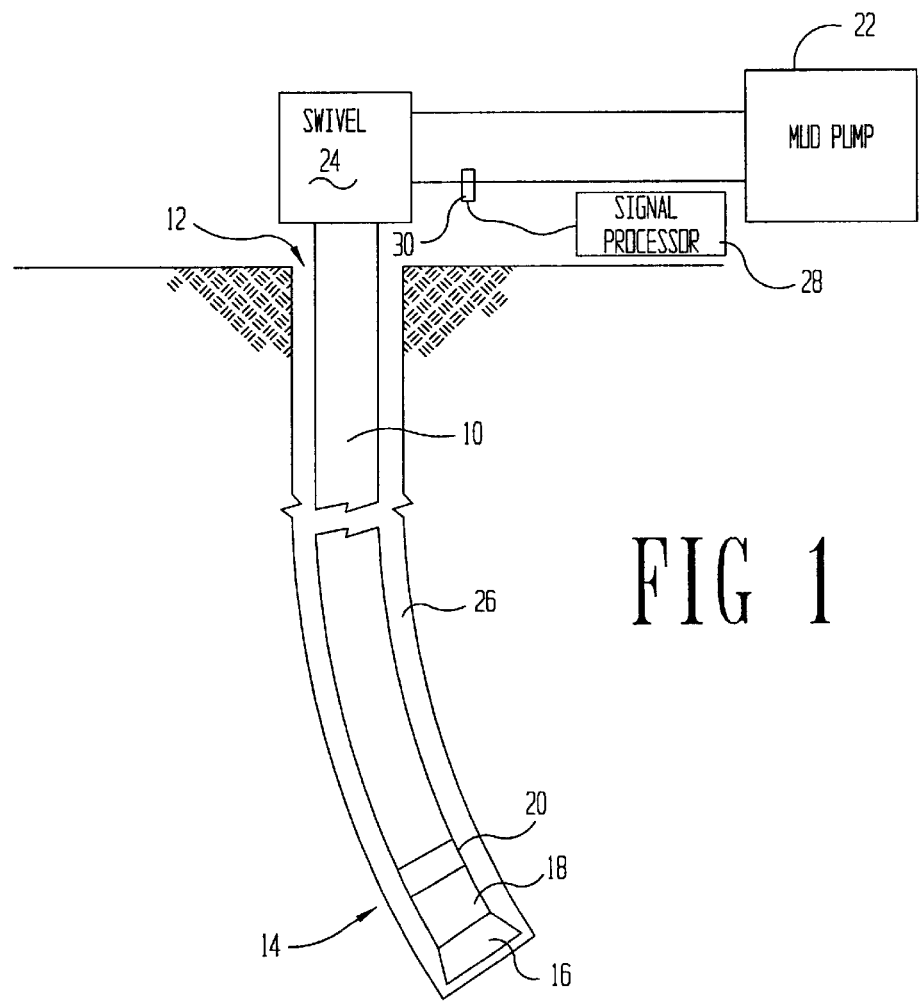
FIG. 1 shows an exemplary mud pulse telemetry system.

FIG. 1 shows an embodiment of a drilling system having a drill string 10 within a borehole 12. The drill string 10 has at a lower end a bottomhole assembly 14 which may comprise a drill bit 16, downhole sensors 18, and a transmitter or pulser 20. The downhole sensors 18 may comprise any logging-while-drilling (LWD) or measuring-while-drilling (MWD) devices. The bottomhole assembly may also comprise systems to facilitate deviated drilling such as mud motors with bent housings, rotary steerable systems, and the like. Moreover, the lower end of the drill string 10 may also comprise one or more drill collars (not specifically shown) to assist in maintaining the weight on the bit 16. Drill string 10 is fluidly coupled to the mud pump 22 through a swivel 24. The swivel allows the drilling fluid or mud to be pumped into the drill string, even if the drill string is rotating as part of the drilling process. In alternative embodiments, the bottomhole assembly 14 mechanically and fluidly couples to the surface by way of coiled tubing; however, the methods of transmitting information from the bottomhole assembly to the surface described in this patent may remain unchanged.

Figure 2:
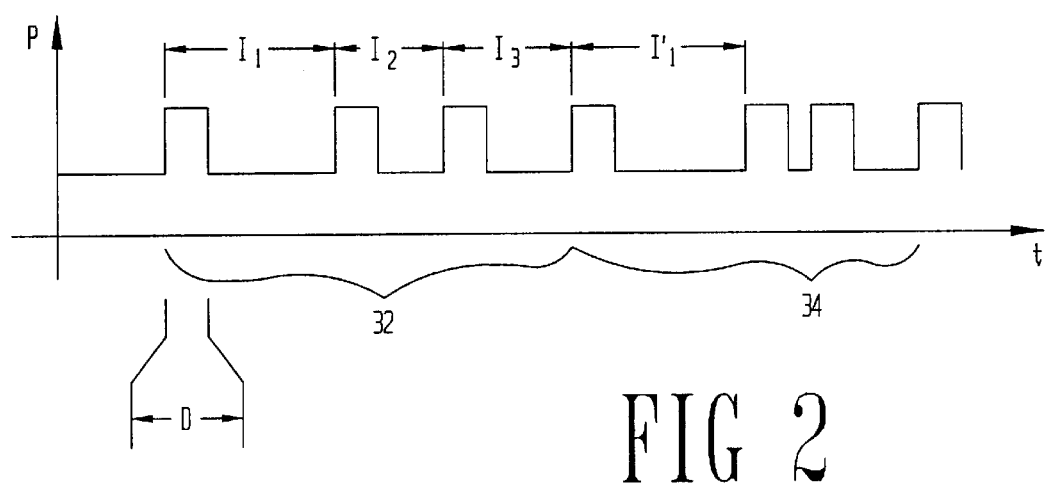
FIG. 2 shows an idealized graph of mud pulses detected in an exemplary system, such as FIG. 1.

In embodiments of the present invention, at least some of the information gathered by the downhole sensors 18 is transferred to the surface by pulse position modulation encoding using the drilling fluid within the drill string 10 as the transmission medium. Transmitter 20 may create the pressure pulses. FIG. 2 shows an idealized graph of drilling fluid pressure as a function of time, which may be measured by the signal processor 28 coupled to the pressure sensing device 30 (FIG. 1). The graph of FIG. 2 represents an ideal situation where perfectly square wave pulses generated are detected as perfectly square waves by the pressure sensor 30. In actual systems, this is not the case, but the exemplary graph of FIG. 2 is helpful to describe certain concepts of the various embodiments.

The exemplary graph of FIG. 2 shows three intervals, labeled $I_1$, $I_2$, and $I_3$. Intervals are the length of time between the leading (or alternatively trailing) edges of the pulses, and the intervals preferably contain the encoded information. As will be discussed more thoroughly below, in the preferred embodiments information is transferred from downhole to the surface in groups or lists. The series of pulses creating intervals $I_1$, $I_2$, and $I_3$ may represent a first list 32 transmitted from downhole to the surface. Likewise, the second group of pulses may represent a second list 34. Identification of the start of a list preferably involves sending an interval of longer duration (for example $I_1$ or $I'_1$) than a maximum that may be expected for the remaining or data intervals of the list.

A transmitter or pulser 20 creating positive pulses, such as those idealized in FIG. 2, operates by momentarily impeding the flow of drilling fluid within the drill string. The principle of operation of the various embodiments does not change, however, if the transmitter or pulser 20 creates negative pressure pulses, such as by allowing the drilling fluid within the drill string to vent to the annulus 26 without passing through the drill bit 16. Negative pressure pulse operation simply inverts the exemplary drawing of FIG. 2, but may not otherwise change the operation. Although not necessarily a part of the encoding scheme, the pulse duration, exemplified in FIG. 2 as "D", may be a controlled parameter. Embodiments of this invention may use pulse durations of between approximately 0.08 seconds and 0.4 seconds. Longer pulse durations are used in deeper wells, or in wells where the drilling fluid has higher attenuation properties. Preferably, however, the pulse duration is 0.1 to 0.2 seconds.

Figure 3:
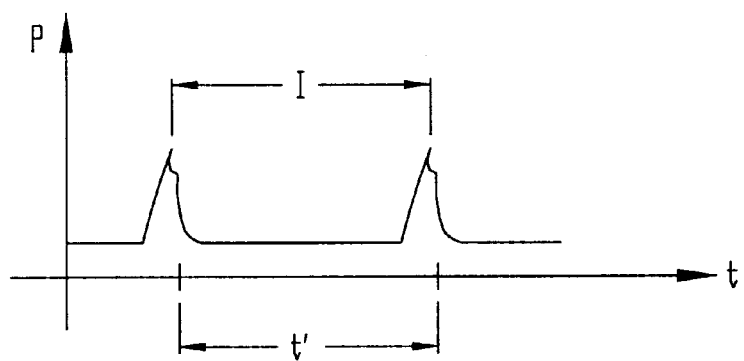
FIG. 3 shows a more realistic illustration of mud pulses detected at the surface, and also exemplifies an interval duration.
Figure 4:
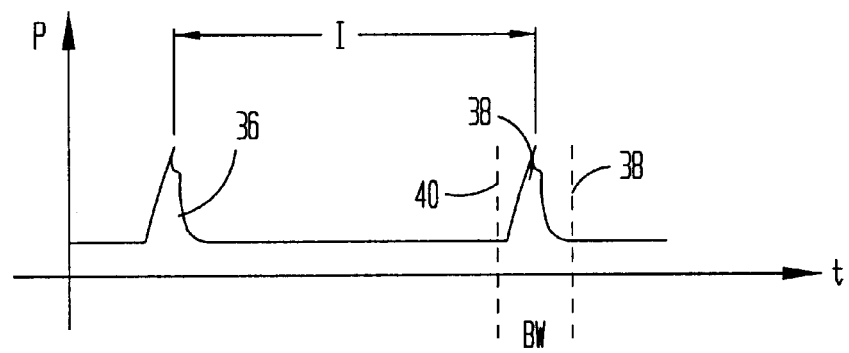
FIG. 4 shows exemplary mud pulses and further illustrates the concept of a bit width.

FIG. 3 shows a more realistic representation of drilling pressure pulses that may be detected in an actual drilling system. In the preferred embodiments, information or data is encoded in the time between two pulses. Thus, the time duration of intervals changes to represent different information. For each physical drilling system, there is defined a minimum-time (MIN-TIME) between two pulses. An interval having the MIN-TIME duration represents a data value zero. The greater the duration of an interval over the MIN-TIME, the larger the data value encoded. Because of noise encountered by pressure pulses as they propagate to the surface, the timing between pulses may differ at the surface from what was created downhole. Embodiments of the present invention thus define a BIT-WIDTH as a time window used to determine the data value transmitted. FIG. 4 illustrates the BIT-WIDTH (BW in FIG. 4) concept with reference to a first pulse 36 followed by a second pulse 38. The data defined by the interval "I" is considered to be the same as long as it falls within the window defined by dashed lines 40 and 42. Thus, the parameters of interest in determining data encoded are the duration of each interval, the MIN-TIME representing a data value zero, and the BIT-WIDTH. The MIN-TIME representing a data value zero may range from approximately 0.3 seconds to 2.0 seconds, but preferably a MIN-TIME of 0.6 seconds is used for positive-pulsers, and approximately 1.0 second for negative-pulsers. The MIN-TIME, using technology in existence as of the filing of this patent, may be at least three times the pulse duration. The BIT-WIDTH may range from approximately 0.03 seconds to 0.12 seconds, with 0.04 seconds preferred.

Thus, with the MIN-TIME and BIT-WIDTH defined for a particular system, and measuring an interval time or duration, a data value sent may be decoded using substantially the following equation:

$$\text{DATA} = (\text{INTERVAL} - \text{MIN-TIME})/\text{BIT-WIDTH} \quad (1)$$

where DATA is the decoded data, and INTERVAL is the time duration of the interval. Consider for purposes of explanation, and without limitation, a measured interval of 1.12 seconds in a system having a MIN-TIME of 1.0 second, and a BIT-WIDTH of 0.04 seconds. Applying these values to equation (1) above reveals a data value of three (having a digital representation of 011). The larger the data value encoded, the greater the time duration required to represent that data value.

The number of bits encoded within each data interval may be selected to be the number of bits whose average value produces an interval duration of approximately one and a half times the MIN-TIME. Stated differently, at least some embodiments encode a number of bits whose maximum value multiplied by the BIT-WIDTH is approximately equal to the MIN-TIME. Stated differently again, at least some embodiments encode a number of bits in each data interval where the maximum value for the number of bits encoded produces an interval duration approximately twice the MIN-TIME. Consider as an example, and not as a limitation as to the breadth of the invention, a system where the MIN-TIME is 0.6 seconds, and the BIT-WIDTH is 0.04 seconds. Further consider the transfer of an eight bit value having all bits asserted (a decimal value of 255). By rearranging equation (1) above, it is possible to determine an interval duration given a particular data value, MIN-TIME and BIT-WIDTH. In particular, equation (1) algebraically manipulated reads as follows:

$$\text{INTERVAL} = (\text{DATA} \times \text{BIT-WIDTH}) + \text{MIN-TIME} \quad (2)$$

Applying the data value of 255, the BIT-WIDTH of 0.04 seconds and the MIN-TIME of 0.6 seconds, the equation predicts an interval duration of 10.8 seconds. Now consider the same eight bit number with all the bits asserted, yet the eight bit number is split and sent in two intervals having four bits each. Each four bit portion of the eight bit number, with all bits asserted, therefore represents a value of 15. Applying the data value 15 to equation (2) predicts an interval duration of 1.2 seconds for each four bit transfer, for a total of 2.4 seconds for the total transfer of eight bits, which bits may then be combined after decoding to obtain again the eight bit number.

Consider now a plurality of eight bit numbers. If the probability of occurrence of any of the eight bit numbers is exactly the same, then the average value transmitted would be 127.5. The time to transfer the average number, using equation (2) above, would be 5.7 seconds. If the eight bit number is split into two four-bit transfers, the average value for each of the four-bit transfers would be 7.5. Applying a data value of 7.5 to equation (2) predicts a transfer time of 0.9 seconds for each transfer, for a total of 1.8 seconds for the transfer of the total eight bits. Here again, splitting the eight-bit number into two four-bit numbers, given the BIT-WIDTH and MIN-TIMES above, decreases the amount of time required to transfer all eight bits of information.

MWD and LWD information gathered downhole may have a varying number of bits. For example, the MWD reading of downhole pressure preferably comprises 12 bits of information to provide the necessary resolution of the data value. By contrast, LWD values such as the electromagnetic wave resistivity and the gamma ray readings may comprise only eight bit data values to have the necessary resolution. Embodiments of the present invention group into lists downhole parameters that need to be transmitted uphole. For example, a first list may comprise electromagnetic wave resistivity reading (an eight bit value), a gamma ray reading (an eight bit value), and a density reading (a 12 bit value). Multiple lists may be created. Moreover, in a continuous operation mode, the downhole device cyclically transmit the predefined lists, and therefore repeatedly sends the data values contained in those lists.

The following table exemplifies the components of a list structure of the preferred embodiments.

TABLE 1

| Interval | Bit Number | | | | | | | |
|---|---|---|---|---|---|---|---|---|
| | 7 | 6 | 5 | 4 | 3 | 2 | 1 | 0 |
| 1 | PAD2 | PAD1 | PAD0 | P4 | P3 | P2 | P1 | P0 |
| 2 | 0 | 0 | 0 | 0 | ID3 | ID2 | ID1 | ID0 |
| 3 | 0 | 0 | 0 | 0 | A7 | A5 | A3 | A1 |
| 4 | 0 | 0 | 0 | 0 | A6 | A4 | A2 | A0 |
| 5 | 0 | 0 | 0 | 0 | B7 | B5 | B3 | B1 |
| 6 | 0 | 0 | 0 | 0 | B6 | B4 | B2 | B0 |
| 7 | 0 | 0 | 0 | 0 | C3 | C2 | C1 | C0 |
| 8 | 0 | 0 | 0 | 0 | C7 | C6 | C5 | C4 |
| 9 | 0 | 0 | 0 | 0 | C11 | C10 | C9 | C8 |

In Table 1 (PAD 2 . . . PAD 0) are pad bits for the creation of the long interval, (P4 . . . P0) are parity bits based on the data contained in the list, (ID3 . . . ID0) are identification bits which identify the list, (A7 . . . A0) are eight bits of a first downhole parameter, (B7 . . . B0) are eight bits of a second downhole parameter, and (C11 . . . C0) are twelve bit of a third pararneter. Table 1 exemplifies that in the preferred embodiment the data intervals (intervals 2–9) are encoded using a number of bits based on a particular BIT-WIDTH and MIN-TIME. For a MIN-TIME of 0.6 seconds and a BIT-WIDTH of 0.04 seconds, four bit data intervals are preferred.

In the preferred embodiments, each list contains a plurality of parity bits, in the preferred embodiments five parity bits as exemplified in Table 1 bits (P4 . . . P0). The parity bits allow a surface signal processor, such as signal processor 28 of FIG. 1, to determine whether bit errors have occurred in the transmission of the data. Co-pending application Ser. No. 10/305,529 titled "Data Recovery for Pulse Telemetry Using Pulse Position Modulation," incorporated herein by reference as if reproduced in full below, discusses techniques to detect and correct data errors using parity bits.

Calculating the parity bits to be transmitted to the surface preferably involves repeated binary logic exclusive-or (XOR) and shift left operations, with wrap-around. This operation is best described by illustrating the calculation on the exemplary list of Table 1.

TABLE 2

| | Bit | | | | | | | |
|---|---|---|---|---|---|---|---|---|
| | 7 | 6 | 5 | 4 | 3 | 2 | 1 | 0 |
| Initial Parity | 0 | 0 | 0 | 0 | 0 | 0 | 0 | 0 |
| XOR With Second Interval Data | 0 | 0 | 0 | 0 | ID3 | ID2 | ID1 | ID0 |
| Result of XOR | 0 | 0 | 0 | 0 | ID3 | ID2 | ID1 | ID0 |
| Shift-Left Result | 0 | 0 | 0 | ID3 | ID2 | ID1 | ID0 | 0 |
| Replace Bit 0 with Bit 5 | 0 | 0 | 0 | ID3 | ID2 | ID1 | ID0 | 0 |

Table 2 exemplifies a preferred first step in calculating the parity values. The initial parity preferably starts with all bits equal to zero, and the initial parity is XOR'd with the second interval data to yield the result. In the case of the first calculation, the result is simply the same as the second interval data (in the preferred embodiments, the identification bits). The bits are then shifted left by one bit position, and the bit in position five is placed in the zero bit position. In the exemplary Table 2, bit position five contains a value zero, and thus the wrap-around in this particular instance does not change the left-shifted result. After the wrap-around, the data represents an intermediate parity value (ID3, ID2, ID, ID0, 0).

TABLE 3

| | Bit | | | | | | | |
|---|---|---|---|---|---|---|---|---|
| | 7 | 6 | 5 | 4 | 3 | 2 | 1 | 0 |
| Intermediate Parity | 0 | 0 | 0 | ID3 | ID2 | ID1 | ID0 | 0 |
| XOR with Third Interval Data | 0 | 0 | 0 | 0 | A7 | A5 | A3 | A1 |
| Result of XOR | 0 | 0 | 0 | Q4 | Q3 | Q2 | Q1 | Q0 |
| Shift-Left Result | 0 | 0 | Q4 | Q3 | Q2 | Q1 | Q0 | 0 |
| Replace Bit 0 with Bit 5 | 0 | 0 | 0 | Q3 | Q2 | Q1 | Q0 | Q4 |

Preferably, the next step, referring to Table 3, is an XOR of the intermediate parity calculated for the second interval data (see Table 2) with the third interval data to produce a result (Q4 . . . Q0). The result is left-shifted by one bit position and the bit in position five, in this case (Q4), is wrapped-around to the zero bit position, yielding the next intermediate parity value (Q3, Q2, Q1, Q0, Q4).

TABLE 4

| | Bit | | | | | | | |
|---|---|---|---|---|---|---|---|---|
| | 7 | 6 | 5 | 4 | 3 | 2 | 1 | 0 |
| Intermediate Parity | 0 | 0 | 0 | Q4 | Q3 | Q2 | Q1 | Q4 |
| XOR With Fourth Interval | 0 | 0 | 0 | 0 | A6 | A4 | A2 | A0 |
| Result of XOR | 0 | 0 | 0 | R4 | R3 | R2 | R1 | R0 |
| Shift-Left Result | 0 | 0 | R4 | R3 | R2 | R1 | R0 | 0 |
| Replace Bit 0 with Bit 5 | 0 | 0 | 0 | R3 | R2 | R1 | R0 | R4 |

Preferably, the next step, referring to Table 4, is an XOR of the fourth interval data (A6 . . . A0) with the intermediate parity value calculated for third interval data (see Table 3) to produce a result (R4 . . . R0). The result then left-shifted, and the fifth bit position wrapped-around to the zero bit position, producing an intermediate parity value (R3, R2, R1, R0, R4). This pattern preferably repeats for each interval in the list. Although the list exemplified in Table 1 has nine intervals, any number of intervals may be used.

TABLE 5

|  | Bit | | | | | | | |
| --- | --- | --- | --- | --- | --- | --- | --- | --- |
|  | 7 | 6 | 5 | 4 | 3 | 2 | 1 | 0 |
| Intermediate Parity | 0 | 0 | 0 | W3 | W2 | W1 | W0 | W4 |
| XOR With Ninth Interval Data | 0 | 0 | 0 | 0 | C11 | C10 | C9 | C8 |
| Result of XOR | 0 | 0 | 0 | X4 | X3 | X2 | X1 | X0 |
| Shift-Left Result | 0 | 0 | X4 | X3 | X2 | X1 | X0 | 0 |
| Replace Bit 0 with Bit 5 | 0 | 0 | 0 | PAR4 (X3) | PAR3 (X2) | PAR2 (X1) | PAR1 (X0) | PAR0 (X4) |

Preferably, the final step, referring to Table 5, is an XOR of the last interval (in this example the ninth interval) with the intermediate parity calculated for the previous interval to produce the result (X4 . . . X0). This result is preferably left-shifted by one bit position and the value at the fifth bit position is then wrapped-around to the zero bit position to produce the parity values (PAR4 . . . PAR0) (the respective pre-wrap-around values shown in parenthesis).

For the MIN-TIME and BIT-WIDTH ranges provided in this specification, the preferred embodiments utilize an eight-bit first or initial interval, followed by four-bit intervals for the remaining data intervals in a list to reduce overall data transmission time. Four bits for the data intervals is also convenient from the standpoint that most of the data collected by downhole devices is either eight-bit or twelve-bit data. However, other combinations of MIN-TIME and BIT-WIDTH may make other data interval bit lengths desirable. The number of downhole parameters that may be transmitted to the surface in any list is not limited to the three shown in the exemplary embodiment of Table 1. Moreover, the identification bits need not necessarily be in the second interval, and may be split between intervals.

Referring again briefly to Table 1, it is seen that the initial interval of the preferred embodiments encodes eight bits of information, five parity bits and three pad bits. The first interval in a list preferably has a longer duration than a maximum possible duration for the intervals encoding data and identification bits (the four bit intervals). In order to reduce the overall transmission time of data from downhole to the surface, the preferred embodiments may also adjust the pad bits such that the initial interval exceeds a maximum duration of data intervals (which may include identification bits), but only by as much as necessary to establish it as a long interval. The value of the pad bits to accomplish this task are related to the value of the parity bits. In particular, if the parity bit "P4" is not set, it may be necessary to set pad bit PAD0. If, however, the parity calculated for the particular list has the parity bit "P4" set, it may not be necessary to assert any of the pad bits, as the "P4" parity being set may be sufficient to ensure the duration of the first interval is longer than any of the data intervals. In the preferred embodiments, so long as the calculated parity has a value of eighteen (binary 10010) or greater, the pad bits are zeroed. This allows for a first interval of sufficient length, as well as error detection and correction operations as discussed in the co-pending application, discussed above. If the calculated parity is less than eighteen, the least significant pad bit (PAD0) is set. The remaining pad bits are included for the possibility of increasing the first interval time (and therefore decreasing transmission rate) if and when desired. The PAD1 and PAD2 bits are preferably not set during normal operation.

The above discussion is meant to be illustrative of the principles and various embodiments of the present invention. Numerous variations and modifications will become apparent to those skilled in the art once the above disclosure is fully appreciated. For example, FIG. 1 shows the signal processor 28 coupled to a single pressure transducer 30 for detecting the pressure pulses at the surface; however, there are many techniques for detecting pressure pulses at the surface, such as U.S. Pat. No. 6,421,298. One of ordinary skill in the art, now understanding the lists, data encoding and parity operation described herein, could easily identify proper equipment and numerous techniques for detecting the pressure pulses at the surface. Further, the lists of the embodiments described above are composed of a long interval that includes pad bits and parity bits, and subsequent intervals which encode data. However, the long interval need not necessarily lead the data intervals, and instead may identify an end of the list. Further, the parity bits need not necessarily be contained in the first or long interval, and instead may be in one or more short or data intervals. In the embodiments described above, five parity bits and four bits for data intervals are used. However, as parameter changes dictate different numbers of bits in data intervals, the number of parity bits may change as well. Thus, in at least some embodiments, the number of parity bits used exceeds the number of data bits in each interval by at least one bit. In alternative embodiments, the number of parity used may be dependent on the number of intervals, with more parity bits used for greater numbers of intervals. While it is preferred that associated bits are sent in the same or contiguous intervals, in alternative embodiments data may be split across many contiguous, or non-contiguous, intervals. Finally, the system and method described are equally applicable to communications from downhole to surface devices, and from the surface to downhole devices. It is intended that the following claims be interpreted to embrace all such variations and modifications.

What is claimed is:

1. A method of pulse telemetry using pulse position modulation comprising:

sending a long interval, the long interval having encoded therein a value greater than a maximum value for short intervals;

sending a plurality of short intervals, each of the plurality of short intervals having encoded therein a number of bits; and wherein the number of bits encoded in each of the plurality of short intervals is less than a number of parity bits.

2. The method as defined in claim 1 further comprising:
sending the long interval; then
sending the plurality of short intervals; and
wherein the long interval and the plurality of short intervals are a list, and the long interval identifies a beginning of the list.

3. The method as defined in claim 1 wherein each of the plurality of short intervals having encoded therein a same number of bits.

4. The method as defined in claim 1 wherein sending the long interval further comprises encoding in the long interval a number of bits greater than a number of bits encoded in each of the plurality of short intervals.

5. The method as defined in claim 4 further comprising encoding a plurality of parity bits in the long interval.

6. The method as defined in claim 5 further comprising encoding a pad bit in the long interval.

7. The method as defined in claim 6 further comprising encoding three pad bits in the long interval.

8. The method as defined in claim 5 wherein encoding a plurality of parity bits further comprises encoding greater than four parity bits.

9. The method as defined in claim 8 wherein encoding greater than four parity bits further comprises encoding five parity bits.

10. The method as defined in claim 5 further comprising:
encoding five parity bits; and
encoding a pad bit.

11. The method as defined in claim 10 further comprising encoding the pad bit in a most significant position.

12. The method as defined in claim 11 further comprises zeroing the pad bit if the parity bits have a decimal value greater than fifteen.

13. The method as defined in claim 11 further comprises zeroing the pad bit if the parity bits have a decimal value greater than or equal to eighteen.

14. The method as defined in claim 1 further comprising encoding a list identification number.

15. The method as defined in claim 14 further comprising encoding the list identification number in the long interval.

16. The method as defined in claim 14 further comprising encoding the list identification number in the plurality of short intervals.

17. The method as defined in claim 16 further comprising encoding the list identification number in a short interval immediately following the long interval.

18. The method as defined in claim 1 further comprising encoding the parity bits in the plurality of short intervals.

19. A pulse telemetry system comprising:
an assembly adapted to create pressure pulses in drilling fluid, data in the pressure pulses encoded using pulse position modulation;
a signal processor coupled to a pressure sensor, the signal processor and pressure sensor adapted to detect pressure pulses in the drilling fluid and to decode the data; and
wherein the assembly is adapted to send the data in groupings of intervals, a synchronizing interval of a grouping having encoded therein a value greater than a maximum value of each of a plurality of short intervals, and wherein a number of data bits encoded in each of the plurality of short intervals is less than a number of parity bits.

20. The pulse telemetry system as defined in claim 19 wherein the synchronizing interval precedes the plurality of short intervals in a grouping.

21. The pulse telemetry system as defined in claim 19 wherein the synchronizing interval follows the plurality of short intervals in a grouping.

22. The pulse telemetry system as defined in claim 19 wherein each of the plurality of short intervals encodes a maximum of N number of bits, and where the assembly encodes in the synchronizing interval at least N+1 number of bits.

23. The pulse telemetry system as defined in claim 22 wherein the assembly encodes the number of parity bits in the synchronizing interval.

24. The pulse telemetry system as defined in claim 23 further comprising the assembly encoding in the synchronizing interval a pad bit.

25. The pulse telemetry system as defined in claim 24 further comprising the assembly encoding in the synchronizing interval three pad bits.

26. The pulse telemetry system as defined in claim 23 further comprising the assembly encoding greater than four parity bits.

27. The pulse telemetry system as defined in claim 26 further comprising the assembly encoding five parity bits.

28. The pulse telemetry system as defined in claim 23 further comprising the assembly further adapted to encode five parity bits and a pad bit.

29. The pulse telemetry system as defined in claim 28 further comprising the assembly further adapted to encode the pad bit in a most significant position of the synchronizing interval.

30. The pulse telemetry system as defined in claim 29 further comprising the assembly setting the pad bit if the parity bits have a value less than (10000) binary.

31. The pulse telemetry system as defined in claim 29 further comprising the assembly zeroing the pad bit if the parity bits have a value greater than or equal to (10010) binary.

32. The pulse telemetry system as defined in claim 19 further comprising the assembly encoding a list identification number.

33. The pulse telemetry system as defined in claim 32 further comprising the assembly encoding the list identification number in the plurality of short intervals.

34. The pulse telemetry system as defined in claim 32 further comprising the assembly encoding the list identification number in an interval immediately following the synchronizing interval.

35. The pulse telemetry system as defined in claim 19 wherein the assembly encodes the parity bits in the plurality of short intervals.

36. In a pulse position modulation based pulse telemetry system using a minimum time between pulses to define a data value zero, and a series of time windows defining a bit width within which a pulse may fall to represent a data value, a method of operating the pulse telemetry system comprising:
sending a first interval having encoded therein a first interval value;
sending a plurality of intervals, a number of bits encoded in each of the plurality of intervals selected such that an average of possible values for the number of bits encoded multiplied by the bit width is approximately half the minimum time; and wherein the first interval value is greater than a maximum data value of the plurality of intervals for the number of bits selected.

37. The method as defined in claim 36 further comprising sending the first interval, and then sending the plurality of intervals.

38. The method as defined in claim 36 further comprising sending the plurality of intervals, and then sending the first interval.

39. The method as defined in claim 36 wherein four bits are encoded within each of the plurality of intervals.

40. The method as defined in claim 39 further comprising utilizing a minimum time 0.6 seconds, and a bit width of 0.04 seconds.

41. The method as defined in claim 39 wherein the first interval has encoded therein a value of greater than four bits.

42. The method as defined in claim 41 wherein the first interval has encoded therein a value of eight bits.

* * * * *